United States Patent
Mohri et al.

(10) Patent No.: US 10,629,923 B2
(45) Date of Patent: Apr. 21, 2020

(54) RADIATOR CLEANING TREATMENT METHOD AND METHOD FOR CLEANING RADIATOR

(71) Applicant: HONDA MOTOR CO., LTD., Tokyo (JP)

(72) Inventors: Masahiro Mohri, Wako (JP); Masahiko Natsume, Wako (JP); Manabu Tanaka, Wako (JP); Shiro Yagawa, Wako (JP); Daiki Nagata, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 130 days.

(21) Appl. No.: 15/668,700

(22) Filed: Aug. 4, 2017

(65) Prior Publication Data

US 2018/0040908 A1  Feb. 8, 2018

(30) Foreign Application Priority Data

Aug. 5, 2016 (JP) .................. 2016-154605

(51) Int. Cl.
| | |
|---|---|
| *H01M 8/04044* | (2016.01) |
| *H01M 8/04029* | (2016.01) |
| *B01D 15/36* | (2006.01) |
| *H01M 8/043* | (2016.01) |
| *H01M 8/04701* | (2016.01) |
| *H01M 8/1018* | (2016.01) |

(52) U.S. Cl.
CPC ...... *H01M 8/04044* (2013.01); *B01D 15/361* (2013.01); *H01M 8/043* (2016.02); *H01M 8/04029* (2013.01); *H01M 8/04723* (2013.01); *H01M 2008/1095* (2013.01); *H01M 2250/20* (2013.01); *Y02T 90/32* (2013.01)

(58) Field of Classification Search
CPC combination set(s) only.
See application file for complete search history.

(56) References Cited

U.S. PATENT DOCUMENTS

2006/0269807 A1* 11/2006 Fujita ................ H01M 8/04029
429/435

FOREIGN PATENT DOCUMENTS

| JP | 2010-186647 | 8/2010 |
| JP | 2010-192141 | 9/2010 |
| JP | 2010-211964 | 9/2010 |
| JP | 2014-157832 | 8/2014 |

OTHER PUBLICATIONS

Japanese Office Action for corresponding JP Application No. 2016-154605, dated Sep. 24, 2019 (w/ English machine translation).

* cited by examiner

*Primary Examiner* — Ladan Mohaddes
(74) *Attorney, Agent, or Firm* — Mori & Ward, LLP

(57) ABSTRACT

A method for cleaning a radiator of a vehicle, includes stopping the vehicle that includes a fuel cell through which a coolant is to pass. Electric power in the fuel cell is generated to raise a temperature of the coolant while stopping the vehicle. The coolant is circulated from the fuel cell to a radiator while stopping the vehicle. The coolant flowing from the radiator is supplied to an ion exchanger to remove ions from the coolant while stopping the vehicle.

5 Claims, 9 Drawing Sheets

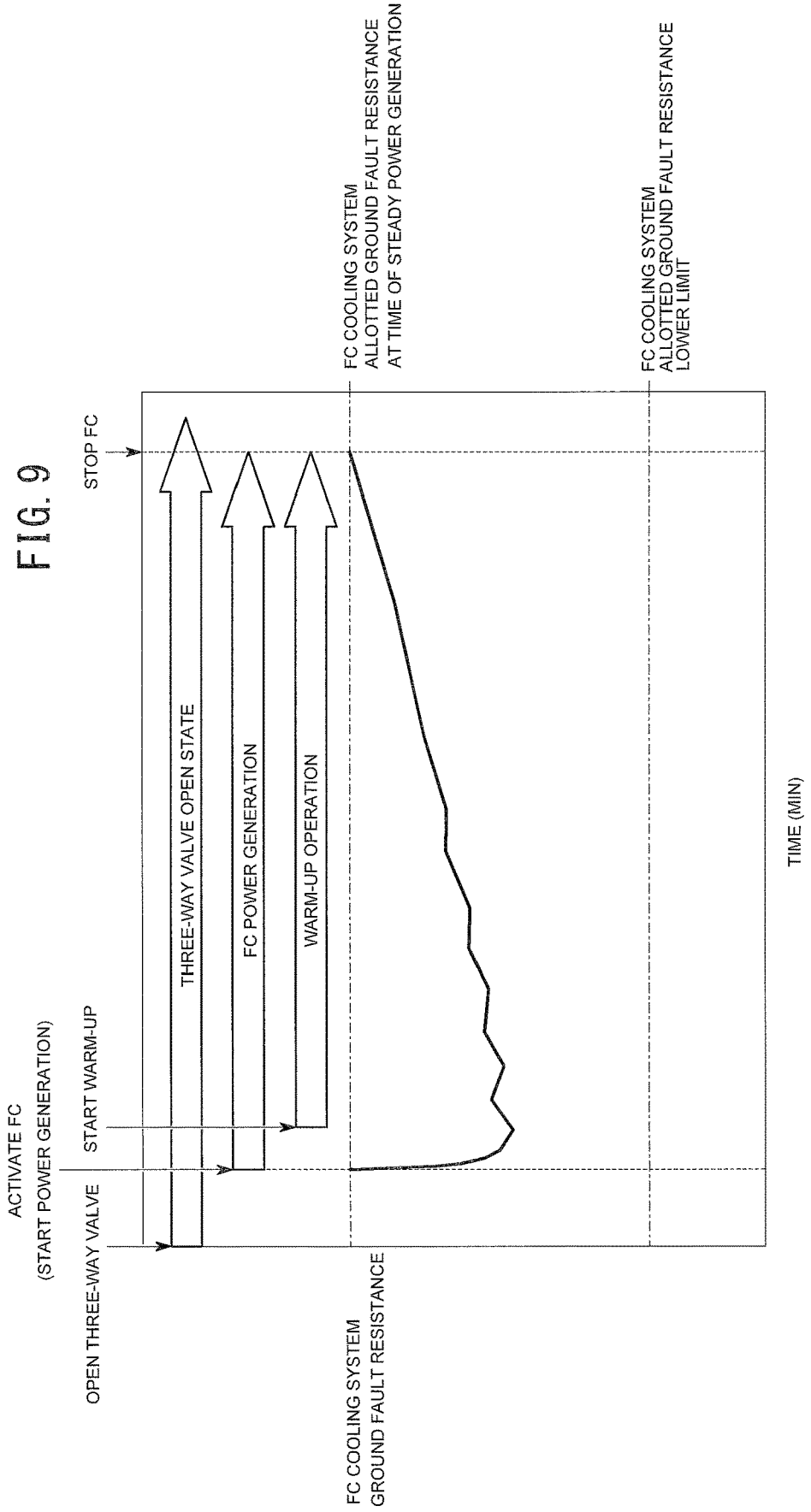

RADIATOR CLEANING TREATMENT METHOD AND METHOD FOR CLEANING RADIATOR

CROSS-REFERENCE TO RELATED APPLICATIONS

The present application claims priority under 35 U. S. C. § 119 to Japanese Patent Application No. 2016-154605, filed Aug. 5, 2016. The contents of this application are incorporated herein by reference in their entirety.

BACKGROUND

1. Field

The present invention relates to a radiator cleaning treatment method and a method for cleaning a radiator.

2. Description of the Related Art

For example, a polymer electrolyte fuel cell includes an electrolyte membrane-electrode assembly (MEA) in which an electrolyte membrane made of a polymer ion-exchange membrane has an anode electrode on one face thereof and a cathode electrode on the other face thereof. The electrolyte membrane-electrode assembly is sandwiched between separators to constitute a power generation cell (unit cell). Typically, a predetermined number of power generation cells are stacked and built into a fuel cell vehicle (such as a fuel cell electric automobile) as an onboard fuel cell stack, for example.

An electric vehicle such as a fuel cell vehicle needs to satisfy the regulations regarding electric safety such as ECE-R100 and FMVSS305. For this reason, the entire electric power train is required to have ground fault resistance meeting the regulatory requirements. To this end, setting is made so that the sum of each device's allotted resistance (ground fault resistance between each device and chassis GND which is the ground potential of the fuel cell vehicle) exceeds the ground fault resistance required by the regulations.

For example, a fuel cell stack has high-voltage devices such as a gas system, a stack peripheral system, and a cooling system, and each of these devices is set with its allotted resistance. In the cooling system, devices such as a radiator, a coolant pump, and an auxiliary device are grounded to chassis GND. Thus, in order for the cooling system to achieve ground fault resistance equal to or larger than its allotted resistance, it is required to manage the coolant conductivity and appropriately set layout of piping (such as a pipe diameter and a pipe length) to each device grounded to the chassis GND.

A fuel cell system disclosed in Japanese Patent Application Publication No. 2014-157832 is known as equipment having this kind of cooling system. This fuel cell system includes: a first coolant system that is configured to circulate and supply coolant through and to a first circulation path including an in-cell coolant passage inside a fuel cell and a coolant cooling device; and a second coolant system that is configured to circulate and supply coolant through and to a second circulation path including the in-cell coolant passage and an ion exchanger. In this system, for control of circulation of coolant by the first coolant system and the second coolant system, the second coolant system circulates and supplies coolant through and to the fuel cell for a predefined priority period in advance upon activation of the fuel cell.

From the start of the priority period, the entire coolant passing through the second circulation path of the second coolant system repeatedly passes through the ion exchanger and ions in the coolant are removed there after circulating through the in-cell coolant passage of the fuel cell. Accordingly, the coolant whose conductivity has been lowered swiftly in the priority period circulates through the in-cell coolant passage of the fuel cell. Thereby, a reduction of insulation properties of the fuel cell caused due to the existence of the coolant can be avoided early and effectively.

SUMMARY

According to one aspect of the present invention, a radiator cleaning treatment method for an onboard fuel cell system includes performing, while a vehicle is stopped, a cleaning treatment. The onboard fuel cell system includes a fuel cell, a radiator, a supply line, an exhaust line, a radiator bypassing line, and an ion exchanger. The fuel cell is provided with a coolant passage for allowing coolant to pass therethrough. The radiator is configured to cool the coolant. The supply line allows the coolant to circulate from an outlet side of the radiator toward a coolant inlet of the fuel cell. The exhaust line allows the coolant to circulate from a coolant outlet side of the fuel cell toward an inlet of the radiator. The radiator bypassing line allows the coolant to circulate from the exhaust line to the supply line while bypassing the radiator. The ion exchanger is configured to remove ions contained in the coolant. The cleaning treatment includes raising a temperature of the coolant by generating power in the fuel cell. The cleaning treatment includes circulating the coolant through the radiator. The cleaning treatment includes causing the ion exchanger to remove ions discharged from the radiator.

According to another aspect of the present invention, a method for cleaning a radiator of a vehicle, includes stopping the vehicle that includes a fuel cell through which a coolant is to pass. Electric power in the fuel cell is generated to raise a temperature of the coolant while stopping the vehicle. The coolant is circulated from the fuel cell to a radiator while stopping the vehicle. The coolant flowing from the radiator is supplied to an ion exchanger to remove ions from the coolant while stopping the vehicle.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 9 is a time chart of the radiator cleaning treatment method according to the third embodiment of the present invention.

DESCRIPTION OF THE EMBODIMENTS

Figure 1:
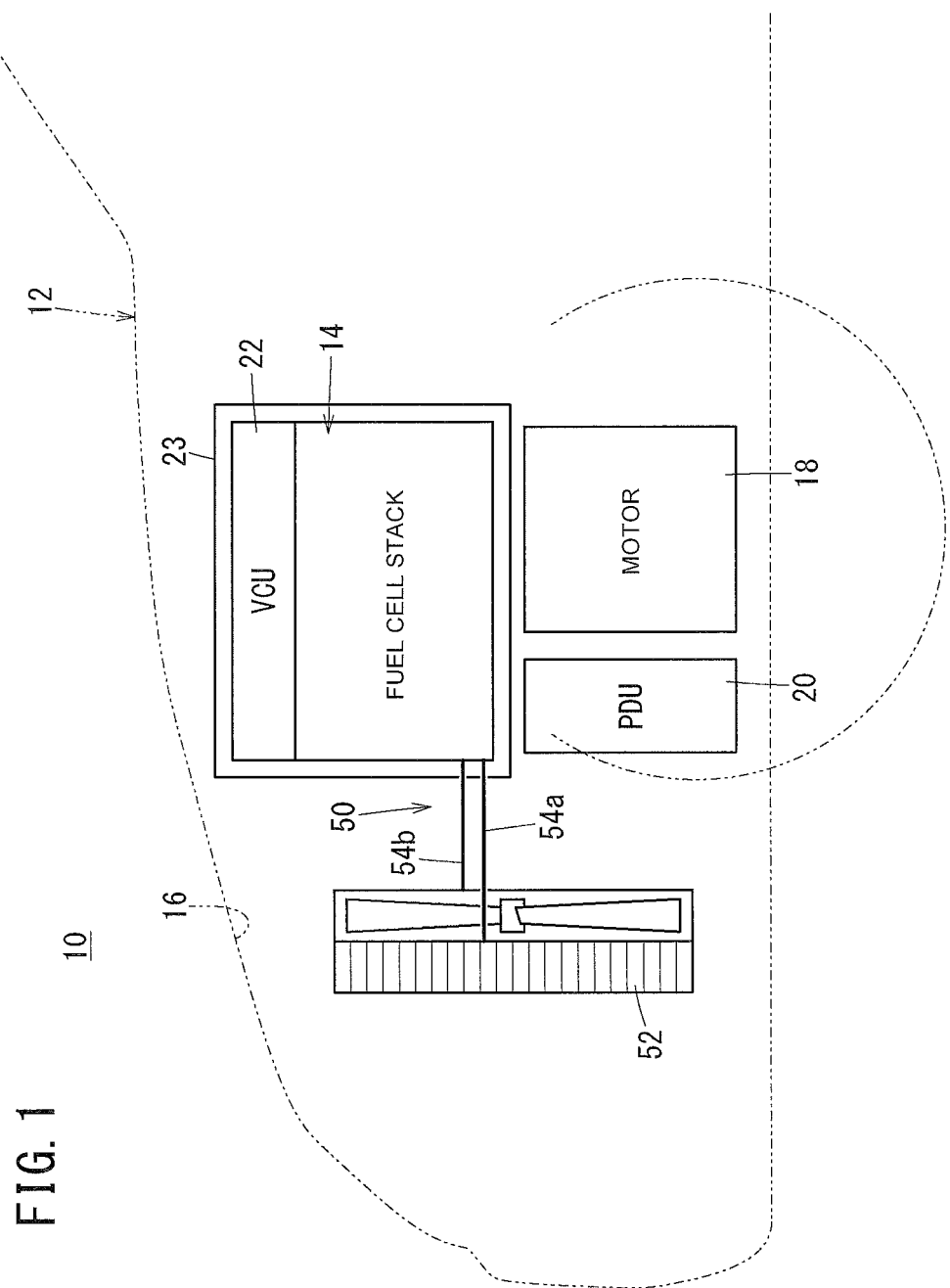
FIG. 1 is a schematic explanatory diagram of a front portion of a fuel cell vehicle to which an onboard fuel cell system is applied.

The embodiments will now be described with reference to the accompanying drawings, wherein like reference numerals designate corresponding or identical elements throughout the various drawings.

As illustrated in FIG. 1, an onboard fuel cell system 10 (hereinafter referred to as the "fuel cell system 10") according to a first embodiment of the present invention is mounted in, for example, a fuel cell vehicle 12 (hereinafter referred to as the "vehicle 12") such as a fuel cell electric automobile. The fuel cell system 10 includes a fuel cell stack 14, and the fuel cell stack 14 is disposed inside a motor room (front box) 16 of the fuel cell vehicle 12.

A traction motor 18 and a power drive unit (PDU) 20 are arranged in the motor room 16. The PDU 20 functions to manage the overall system of the fuel cell vehicle 12, and convert direct-current power from a battery (not illustrated) and fuel cells into three-phase alternating power and transmit it to the traction motor 18.

A voltage control unit (VCU) 22 is placed on an upper part of the fuel cell stack 14, and these are integrally covered with a casing 23. The voltage control unit 22 functions to control an output from the fuel cell stack 14, and may be disposed outside the casing 23.

Figure 2:
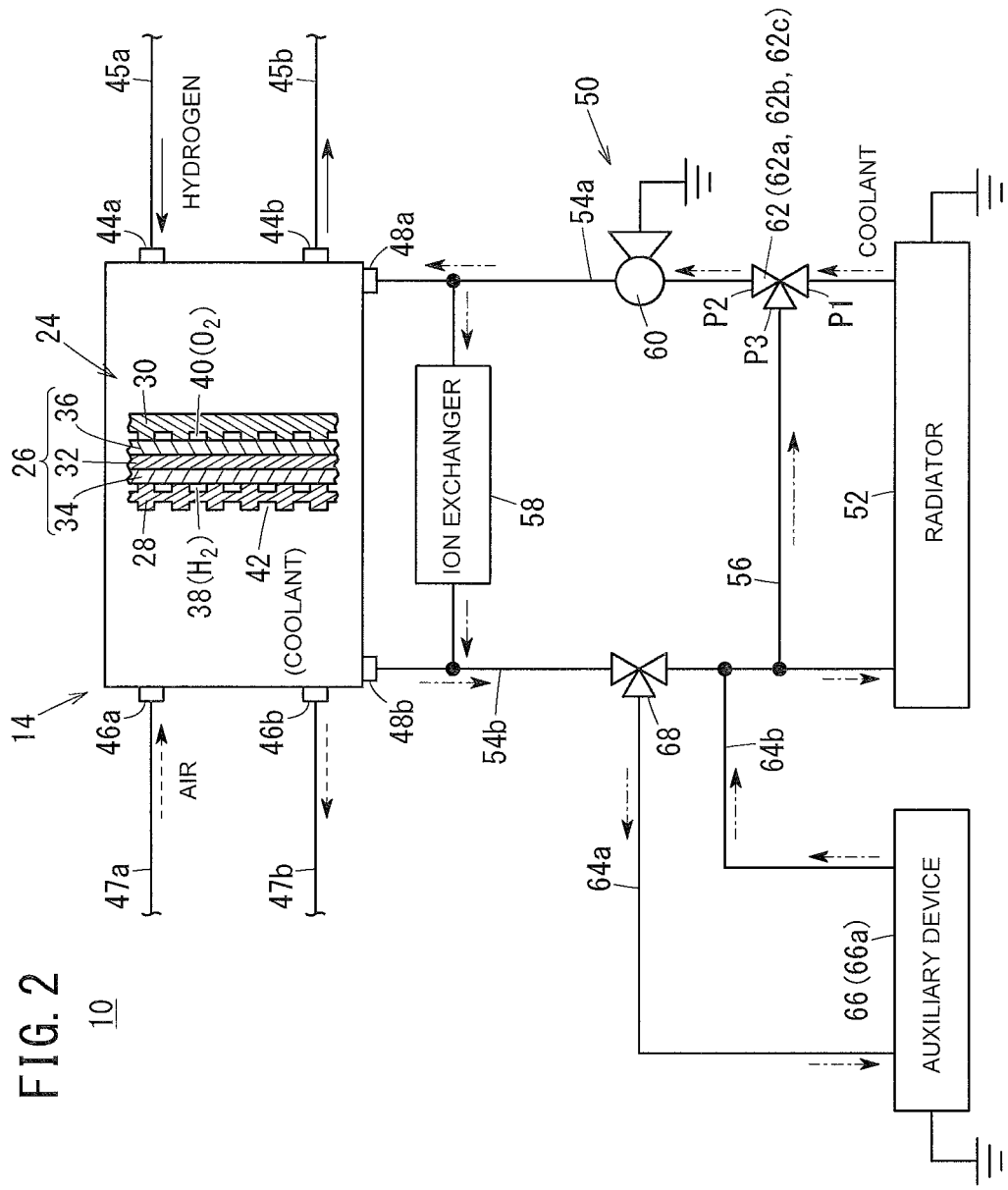
FIG. 2 is an explanatory diagram of a main part of the onboard fuel cell system.

As illustrated in FIG. 2, in the fuel cell stack 14, multiple power generation cells 24 are stacked in a horizontal direction or a vertical direction. Each power generation cell 24 has an electrolyte membrane-electrode assembly 26 sandwiched between a first separator 28 and a second separator 30. The first separator 28 and the second separator 30 are each made of a metallic separator or a carbon separator.

The electrolyte membrane-electrode assembly 26 includes: a solid polymer electrolyte membrane 32 that is a perfluorosulfonic acid membrane containing water; and an anode electrode 34 and a cathode electrode 36 that sandwich the solid polymer electrolyte membrane 32 therebetween. For the solid polymer electrolyte membrane 32, a hydrocarbon (HC) electrolyte is used in addition to a fluorine electrolyte.

The first separator 28 is provided with a fuel gas passage 38 for supplying the anode electrode 34 with hydrogen gas at a position between itself and the electrolyte membrane-electrode assembly 26. The second separator 30 is provided with an oxidizing agent gas passage 40 for supplying the cathode electrode 36 with the air at a position between itself and the electrolyte membrane-electrode assembly 26. A coolant passage 42 for allowing coolant to pass therethrough is provided between the first separator 28 and the second separator 30 adjacent to each other.

The fuel cell stack 14 is provided with: a fuel gas inlet 44a; a fuel gas outlet 44b; an oxidizing agent gas inlet 46a; an oxidizing agent gas outlet 46b; a coolant inlet 48a; and a coolant outlet 48b.

The fuel gas inlet 44a communicates with the supply side of the fuel gas passage 38 through fuel gas supply communication holes of the power generation cells 24 that penetrate in the stacking direction of the cells. The fuel gas outlet 44b communicates with the exhaust side of the fuel gas passage 38 through fuel gas exhaust communication holes of the power generation cells 24 that penetrate in the stacking direction of the cells. A fuel gas supply pipe 45a is connected to the fuel gas inlet 44a, and fuel gas (such as hydrogen) from a fuel gas supply apparatus (not illustrated) is supplied to the fuel cell stack 14 through the fuel gas supply pipe 45a. A fuel gas exhaust pipe 45b is connected to the fuel gas outlet 44b, and fuel gas at least partially used in the anode electrode 34 is discharged from the fuel cell stack 14.

The oxidizing agent gas inlet 46a communicates with the supply side of the oxidizing agent gas passage 40 through oxidizing agent gas supply communication holes of the power generation cells 24 that penetrate in the stacking direction of the cells. The oxidizing agent gas outlet 46b communicates with the exhaust side of the oxidizing agent gas passage 40 through oxidizing agent gas exhaust communication holes of the power generation cells 24 that penetrate in the stacking direction of the cells. An oxidizing agent gas supply pipe 47a is connected to the oxidizing agent gas inlet 46a, and oxidizing agent gas (such as the air) from an oxidizing agent gas supply apparatus (not illustrated) is supplied to the fuel cell stack 14 through the oxidizing agent gas supply pipe 47a. An oxidizing agent gas exhaust pipe 47b is connected to the oxidizing agent gas outlet 46b, and oxidizing agent gas at least partially used in the cathode electrode 36 is discharged from the fuel cell stack 14.

The coolant inlet 48a communicates with the supply side of the coolant passage 42 through coolant supply communication holes of the power generation cells 24 that penetrate in the stacking direction of the cells. The coolant outlet 48b communicates with the exhaust side of the coolant passage 42 through coolant exhaust communication holes of the power generation cells 24 that penetrate in the stacking direction of the cells.

A coolant supply apparatus 50 constituting a cooling system of the fuel cell system 10 includes: a radiator 52 that is configured to cool coolant; a supply pipe 54a (supply line) that allows coolant to circulate from the outlet side of the radiator 52 toward the coolant inlet 48a of the fuel cell stack 14; and an exhaust pipe 54b (exhaust line) that allows coolant to circulate from the coolant outlet 48b side of the fuel cell stack 14 toward the inlet of the radiator 52. The coolant supply apparatus 50 also includes: a bypass pipe 56 (radiator bypassing line) that allows coolant to circulate from the exhaust pipe 54b to the supply pipe 54a while bypassing the radiator 52; and an ion exchanger 58 that is configured to remove ions contained in coolant. Here, the ion exchanger 58 may be located at any position as long as it is installed on the coolant circulation line.

One end of the supply pipe 54a is connected to the coolant inlet 48a of the fuel cell stack 14. The other end of the supply pipe 54a is connected to the inlet side of the radiator 52. A coolant pump 60 and three-way valve 62 for circulation of coolant are arranged on the supply pipe 54a.

One end of the exhaust pipe 54b is connected to the coolant outlet 48b of the fuel cell stack 14. The other end of the exhaust pipe 54b is connected to the inlet side of the radiator 52. One end of the bypass pipe 56 is connected to an intermediate point of the exhaust pipe 54b. The other end of the bypass pipe 56 is connected to the three-way valve 62 (switching valve). When the three-way valve 62 is open, ports P1, P2, and P3 communicate with one another. Thus, coolant circulates through the bypass pipe 56 as well as circulates through the radiator 52. On the other hand, when the three-way valve 62 is closed, the communication between the port P1 and the port P2 and the communication between the port P1 and the port P3 are shut off, and the port P2 and the port P3 communicate with each other. Thus, coolant circulates through the bypass pipe 56 without circulating through the radiator 52.

Note that the three-way valve 62 may be constructed so as to operate in switching modes of: letting the port P1 and the port P2 communicate with each other and shutting off the communication between the port P2 and the port P3 (the mode of circulating coolant through the radiator 52 without circulating the coolant through the bypass pipe 56); and shutting off the communication between the port P1 and the port P2 and letting the port P2 and the port P3 communicate with each other (the mode of circulating coolant through the bypass pipe 56 without circulating the coolant through the radiator 52).

A three-way valve which may be employed as the three-way valve 62 is: a wax melt-type thermo three-way valve 62a that opens automatically when wax melts at a predetermined temperature; or an electric three-way valve 62b that electrically opens automatically when the temperature of coolant reaches a predetermined temperature or higher. Alternatively, an electric three-way valve 62c that is opened by a valve open command from a controller may be employed as the three-way valve 62. The electric three-way valve 62c used in this case is one which can be opened forcibly by energizing the valve by an external power source (e.g. 12V) and giving a valve open command to the valve.

An auxiliary device 66 is connected to the exhaust pipe 54b through a first connection line 64a and a second connection line 64b. The auxiliary device 66 includes an air conditioner device 66a.

A three-way valve 68 is disposed on the exhaust pipe 54b. The three-way valve 68 is disposed upstream of the point where the bypass pipe 56 is connected to the exhaust pipe 54b. The first connection line 64a is connected to the three-way valve 68. The second connection line 64b is connected to the exhaust pipe 54b at a position downstream of the point where the first connection line 64a is connected to the exhaust pipe 54b and upstream of the point where the bypass pipe 56 is connected to the exhaust pipe 54b. When no coolant is needed in the auxiliary device 66, the three-way valve 68 is switched so that coolant is sent toward the radiator 52 while bypassing the auxiliary device.

The inlet side of the ion exchanger 58 is connected to the supply pipe 54a. The inlet side of the ion exchanger 58 is connected to the supply pipe 54a at a position downstream of the three-way valve 62 (the point of connection between the supply pipe 54a and the bypass pipe 56) (specifically, downstream of the coolant pump 60). The outlet side of the ion exchanger 58 is connected to the exhaust pipe 54b. The outlet side of the ion exchanger 58 is connected to the exhaust pipe 54b at a position upstream of the point where the bypass pipe 56 is connected to the exhaust pipe 54b (specifically, upstream of the three-way valve 68).

The radiator 52, the coolant pump 60, and the auxiliary device 66 are electrically connected to chassis GND (not illustrated) which is the ground potential of the fuel cell vehicle 12.

The operation (normal operation) of the fuel cell system 10 having the above configuration is described below.

Oxidizing agent gas (such as the air) is supplied from the oxidizing agent gas supply apparatus (not illustrated) to the oxidizing agent gas supply communication holes of the power generation cells 24, penetrating in the stacking direction of the cells, through the oxidizing agent gas inlet 46a of the fuel cell stack 14. On the other hand, fuel gas (such as hydrogen gas) is supplied from the fuel gas supply apparatus (not illustrated) to the fuel gas supply communication holes of the power generation cells 24, penetrating in the stacking direction of the cells, through the fuel gas inlet 44a of the fuel cell stack 14.

Thereby, the oxidizing agent gas is introduced to the oxidizing agent gas passage 40 of each second separator 30 through the oxidizing agent gas supply communication holes of the fuel cell stack 14. The oxidizing agent gas flows along the oxidizing agent gas passage 40 to be supplied to the cathode electrode 36 of the electrolyte membrane-electrode assembly 26.

On the other hand, the hydrogen gas is supplied to the fuel gas passage 38 of each first separator 28 through the fuel gas supply communication holes of the fuel cell stack 14. The hydrogen gas flows along the fuel gas passage 38 to be supplied to the anode electrode 34 of the electrolyte membrane-electrode assembly 26.

Accordingly, power is generated in the electrolyte membrane-electrode assembly 26 in such a way that oxygen contained in the oxidizing agent gas supplied to the cathode electrode 36 and fuel gas supplied to the anode electrode 34 are consumed by an electrochemical reaction in an electro-catalyst layer.

Next, the oxidizing agent gas supplied to and partially consumed in the cathode electrode 36 of the electrolyte membrane-electrode assembly 26 is discharged from the oxidizing agent gas outlet 46b through the oxidizing agent gas exhaust communication holes of the power generation cells 24 that penetrate in the stacking direction of the cells. On the other hand, the fuel gas supplied to and partially consumed in the anode electrode 34 of the electrolyte membrane-electrode assembly 26 is discharged from the fuel gas outlet 44b through the fuel gas exhaust communication holes of the power generation cells 24 that penetrate in the stacking direction of the cells.

Meanwhile, in the coolant supply apparatus 50, coolant such as pure water, ethyleneglycol, oil, or a compound of these is supplied to the supply pipe 54a by the action of the coolant pump 60. The coolant is supplied to the coolant supply communication holes of the power generation cells 24 that penetrate in the stacking direction of the cells in the fuel cell stack 14. The coolant supplied to the coolant supply communication holes is introduced to the coolant passage 42 located between the first separator 28 and the second separator 30 adjacent to each other. The coolant cools the electrolyte membrane-electrode assembly 26 by circulating through the coolant passage 42. The coolant is discharged from the coolant outlet 48b to the exhaust pipe 54b through the coolant exhaust communication holes of the power generation cells 24 that penetrate in the stacking direction of the cells.

The coolant is introduced and cooled in the radiator 52 while being partially sent to the auxiliary device 66 through the first connection line 64a to adjust the temperature of the device. In addition, if the temperature of the coolant is relatively low, the coolant bypasses the radiator 52 and circulates through the bypass pipe 56.

In the coolant supply apparatus 50, when the fuel cell stack 14 is started up after being left for a long period, the coolant is supplied to the ion exchanger 58 while bypassing the fuel cell stack 14. This removes ions mixed in the coolant, and thereby enables a reduction of coolant conductivity.

Figure 3:
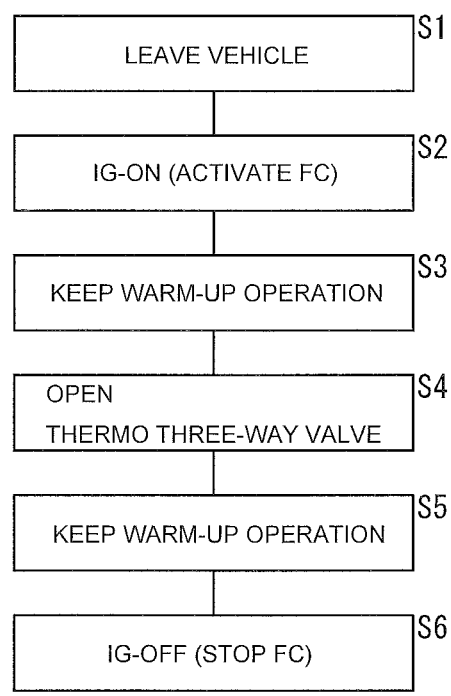
FIG. 3 is a flowchart of a radiator cleaning treatment method according to a first embodiment of the present invention.
Figure 4:
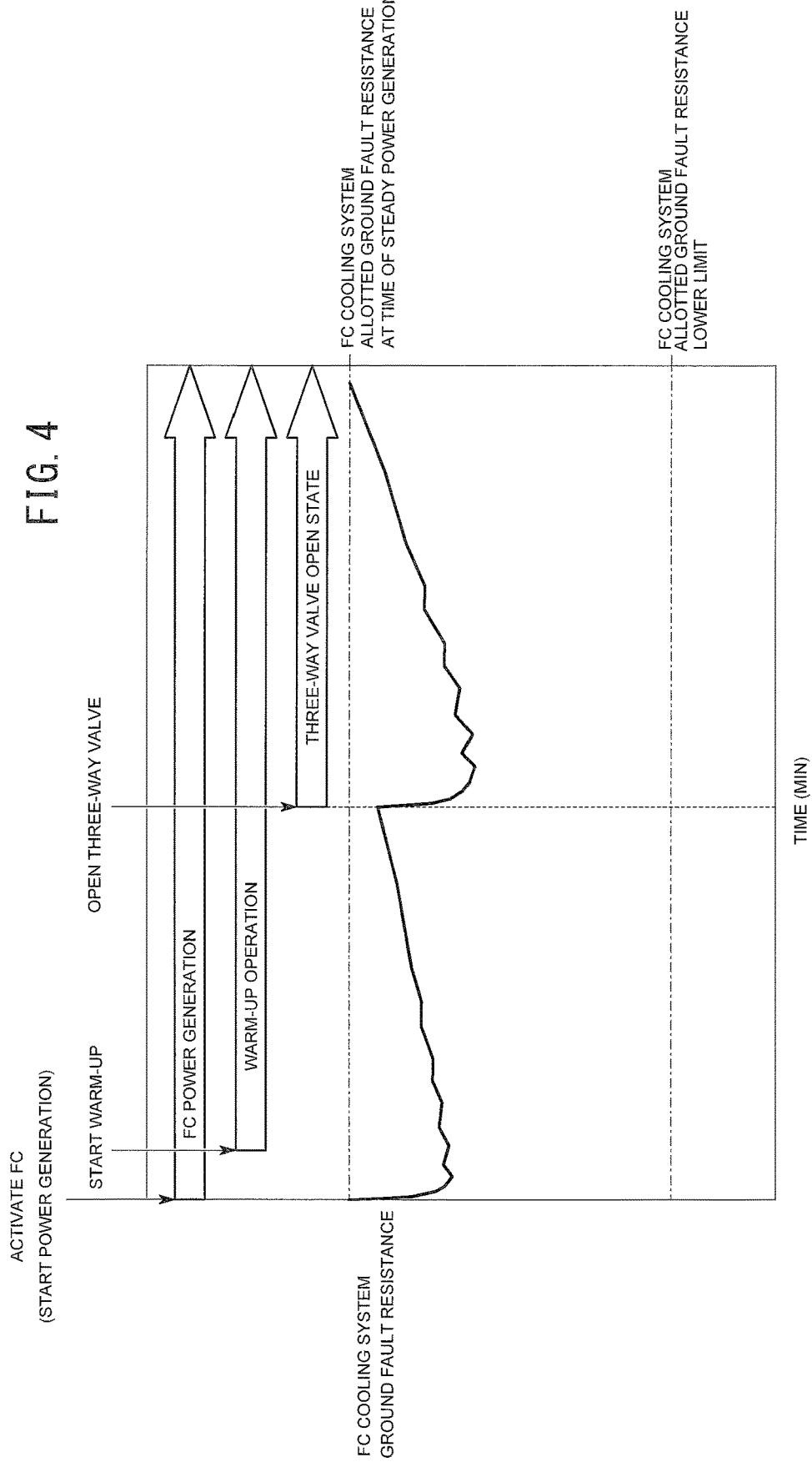
FIG. 4 is a time chart of the radiator cleaning treatment method according to the first embodiment of the present invention.

Next, a radiator cleaning treatment method according to the first embodiment of the present invention is described with the flowchart illustrated in FIG. 3 and the time chart illustrated in FIG. 4. The radiator cleaning treatment method according to the first embodiment is a cleaning method in the case where the wax melt-type thermo three-way valve 62a is used as the three-way valve 62 described above in the fuel cell system 10. Note that, the radiator cleaning treatment method according to the first embodiment is hereinafter sometimes called the "cleaning treatment operation". The same applies to second and third embodiments to be described later.

The radiator cleaning treatment method according to the first embodiment is carried out after the assembly of the vehicle 12 equipped with the fuel cell system 10 is completed and coolant is enclosed in the system (i.e., in a state where the vehicle is completed). Thus, after an elapse of a predetermined period (predetermined time period) or more from when the assembly of the vehicle 12 is completed at a vehicle assembly plant and the inclusion of the coolant in the cooling system of the fuel cell system 10 is completed and before the vehicle is delivered to a user (owner) (at the time of dealer inspection before delivery, for example), the radiator cleaning treatment is performed while the vehicle 12 is stopped. For example, the predetermined period described above is at least one day and in the range of one day (24 hours) to seven days (168 hours), and preferably in the range of one day (24 hours) to three days (72 hours). In addition, this predetermined period is a period (time period) required for ions to be dissolved enough to sufficiently reduce the amount of ions to be dissolved. Hence, in the radiator cleaning treatment method, the vehicle 12 which has been assembled and to which coolant is enclosed is firstly left for the predetermined period or more (Step S1 in FIG. 3).

Next, once an ignition switch of the vehicle 12 is turned on, the fuel cell system 10 is activated, and power generation from the fuel cell stack 14 is started (Step S2 in FIG. 3). Here, immediately after the start of power generation from the fuel cell stack 14, the wax melt-type thermo three-way valve 62a is closed (the mode where only the port P2 and the port P3 communicate with each other).

Subsequently, the warm-up operation of the fuel cell stack 14 (the heating of the coolant by a heating device) is started and this warm-up operation is kept for a predetermined time period (e.g., around several minutes to several tens of minutes) (Step S3). In this case, specifically, coolant is heated by the heater mode of the air conditioner device 66a as the heating device to raise the temperature of the coolant. Preferably, the air conditioner device 66a is operated under the rated power (maximum power) of the heater mode. Further, the windows of the vehicle 12 are preferably fully open.

When the temperature of the coolant is increased to a specified temperature by the power generation and warm-up operation of the fuel cell stack 14, the three-way valve 62 (the wax melt-type thermo three-way valve 62a) opens automatically (Step S4 in FIG. 3). Thereby, the coolant passes through the radiator 52, and circulates through the fuel cell stack 14 and the ion exchanger 58. Then, after the three-way valve 62 opens, the power generation and warm-up operation of the fuel cell stack 14 are still kept for a predetermined time period (around several minutes to several tens of minutes) (Step S5 in FIG. 3).

Thereby, dissolution of ions into the coolant in the radiator 52 is promoted, and the ions in the coolant discharged from the radiator 52 are removed when the coolant containing the ions passes through the ion exchanger 58. In Step S5, the coolant circulates and flows through the coolant supply apparatus 50 (cooling system), and residual ions (ion residues) in the radiator 52 are reduced by the repetition of dissolution of ions from the radiator 52 and removal of the ions in the ion exchanger 58, whereby the coolant conductivity is reduced.

As illustrated in FIG. 4, immediately after power generation from the fuel cell stack 14 is started, the ground fault resistance of the cooling system once decreases because of the flow of coolant containing ions dissolved from metallic members such as metallic separators and pipes; however, as the coolant circulates through the cooling system, the ground fault resistance increases gradually because the ions in the coolant are removed by the ion exchanger 58. Meanwhile, immediately after the wax melt-type thermo three-way valve 62a opens, the ground fault resistance of the cooling system once decreases again because of the flow of coolant containing ions dissolved from the radiator 52; however, as the coolant circulates through the cooling system, the ground fault resistance again increases gradually because the ions in the coolant are removed by the ion exchanger 58.

After the warm-up operation in Step S5 is kept for a predetermined time period, the fuel cell system 10 is stopped by turning off the ignition switch (Step S6 in FIG. 3). If the number of days for which the vehicle is left in Step S1 is short as in the first embodiment, as illustrated in FIG. 4, the ground fault resistance of the cooling system of the fuel cell system 10 does not fall below an allotted ground fault resistance lower limit throughout all the processes of the cleaning treatment operation. The time period for which the warm-up operation in Step S5 is kept is preferably set by previously checking time for the cooling system to recover to the allotted ground fault resistance at the time of steady power generation.

In this case, in the radiator cleaning treatment method according to the first embodiment, while the vehicle 12 is stopped, the temperature of the coolant is raised by generating power in the fuel cell stack 14 and the coolant is made to circulate through the radiator 52, and thus ions discharged from the radiator 52 are removed by the ion exchanger 58. Thereby, the coolant conductivity in the cooling system can be reduced.

Figure 5:
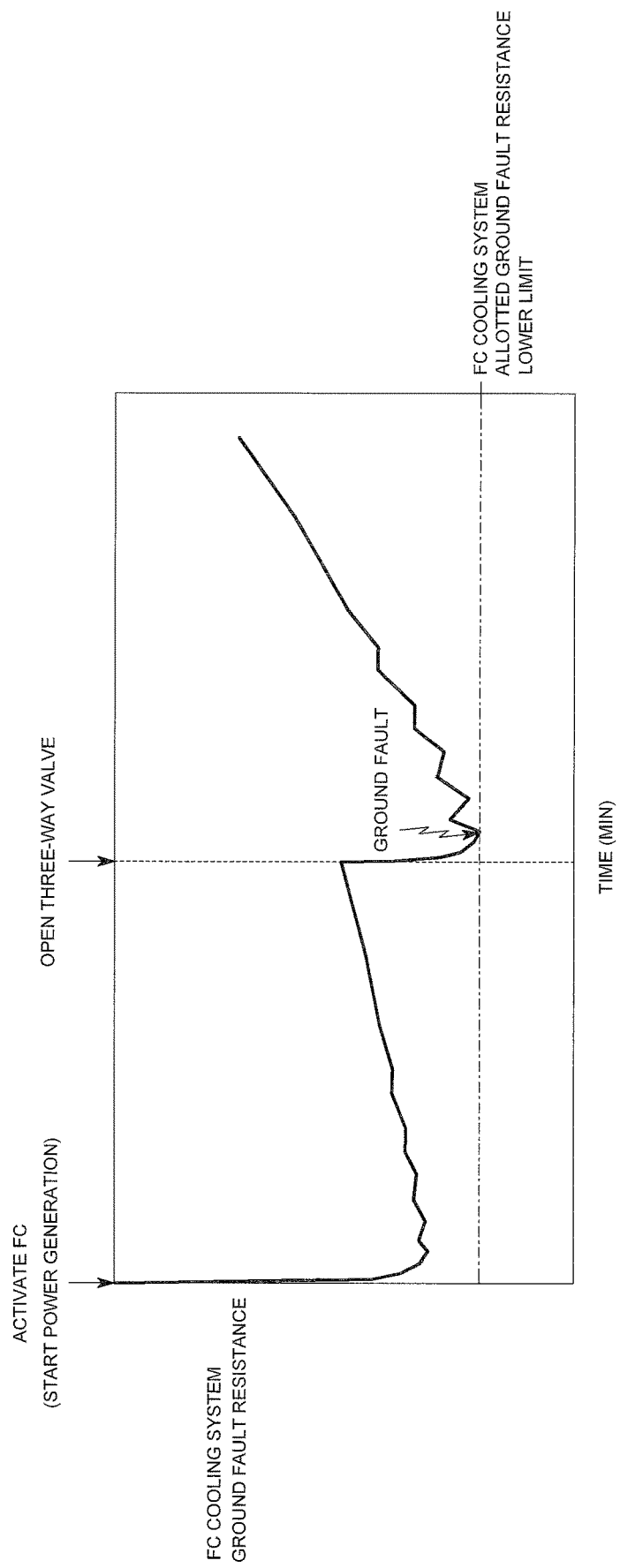
FIG. 5 is a chart explaining the behavior of the ground-fault resistance of a cooling system of the fuel cell system observed when the radiator cleaning treatment method is not performed.

In the meantime, if the cleaning treatment operation described above is not performed unlike the first embodiment, as illustrated in FIG. 5, the ground fault resistance of the cooling system decreases when the fuel cell system 10 is started after the vehicle 12 is left for a long period (e.g., for several weeks or longer). The reason why the ground fault resistance of the cooling system of the fuel cell system 10 decreases in this manner after the vehicle is left for a long period is that the coolant conductivity increases in the cooling system while the vehicle is left for a long period because coolant does not circulate and therefore no ions are removed by the ion exchanger 58 during this period. Specifically, as illustrated in FIG. 5, the ground fault resistance of the cooling system decreases when the fuel cell system 10 is initiated (first state) and when the three-way valve 62 opens, i.e., cooling of coolant through the radiator 52 is started along with power generation (second state).

The deterioration (increase) of coolant conductivity is caused mainly when ions (metallic ions) are dissolved into coolant from metallic members such as the radiator 52, pipes, and metallic separators due to contact of the coolant with these metallic members. In this case, after the vehicle is left for a long period, the coolant conductivity is the highest in the radiator 52, and thus ions in the coolant are mainly composed of ions in the radiator 52. Here, the ions in the radiator 52 are caused mainly by welding flux residues.

Accordingly, if the cleaning treatment operation described above is not performed, coolant with high conductivity is discharged from the radiator 52 toward the fuel cell stack 14 particularly in the second state above. This significantly reduces the ground fault resistance between the coolant inlet 48a of the fuel cell stack 14 and the coolant pump 60 grounded to the chassis GND, as illustrated in FIG. 5.

In contrast, according to the first embodiment, as described above, ions (ion residues) in the radiator 52 are discharged by circulating coolant through the radiator 52 while generating power in the fuel cell stack 14. Then, the ions discharged from the radiator 52 are removed in the ion exchanger 58 by circulating the coolant containing the ions through the ion exchanger 58. Thereby, the coolant conductivity in the cooling system can be reduced.

The rate of dissolution of metallic ions as the source of ions into coolant is defined by a "reaction rate constant of a dissolution reaction on the surface of an ion dissolution source" and a "concentration gradient (diffusion coefficient) in the vicinity of the ion dissolution source", and this rate has been confirmed to be accelerated as the temperature becomes higher. In addition, it has been confirmed that the rate of increase of the coolant conductivity is high in an initial stage and is then decelerated. This is due to the following reason. Because the welding flux residues which are the main component of the ion dissolution source in the radiator 52 are limited and the absolute amount of the ion dissolution source is extremely small, the surface concentration of the ion dissolution source becomes lower along with the dissolution reaction and balances with the concentration of ions in the coolant, whereby the driving force caused by the concentration gradient is reduced.

For this reason, the first embodiment circulates coolant through the radiator 52 while generating power in the fuel cell stack 14. Thus, the temperature of the coolant is raised by waste heat generated when the fuel cell stack 14 generates power, and the heated coolant is introduced into the radiator 52. Thereby, dissolution of ions into the coolant is promoted in the radiator 52. In addition, the first embodiment performs the warm-up operation of heating (raising the temperature of) the coolant by the heater mode of the air conditioner device 66a as well as by the power generation in the fuel cell stack 14. Thus, dissolution of ions into the coolant is further promoted in the radiator 52, whereby the coolant conductivity can be reduced efficiently in a short period.

Figure 6:
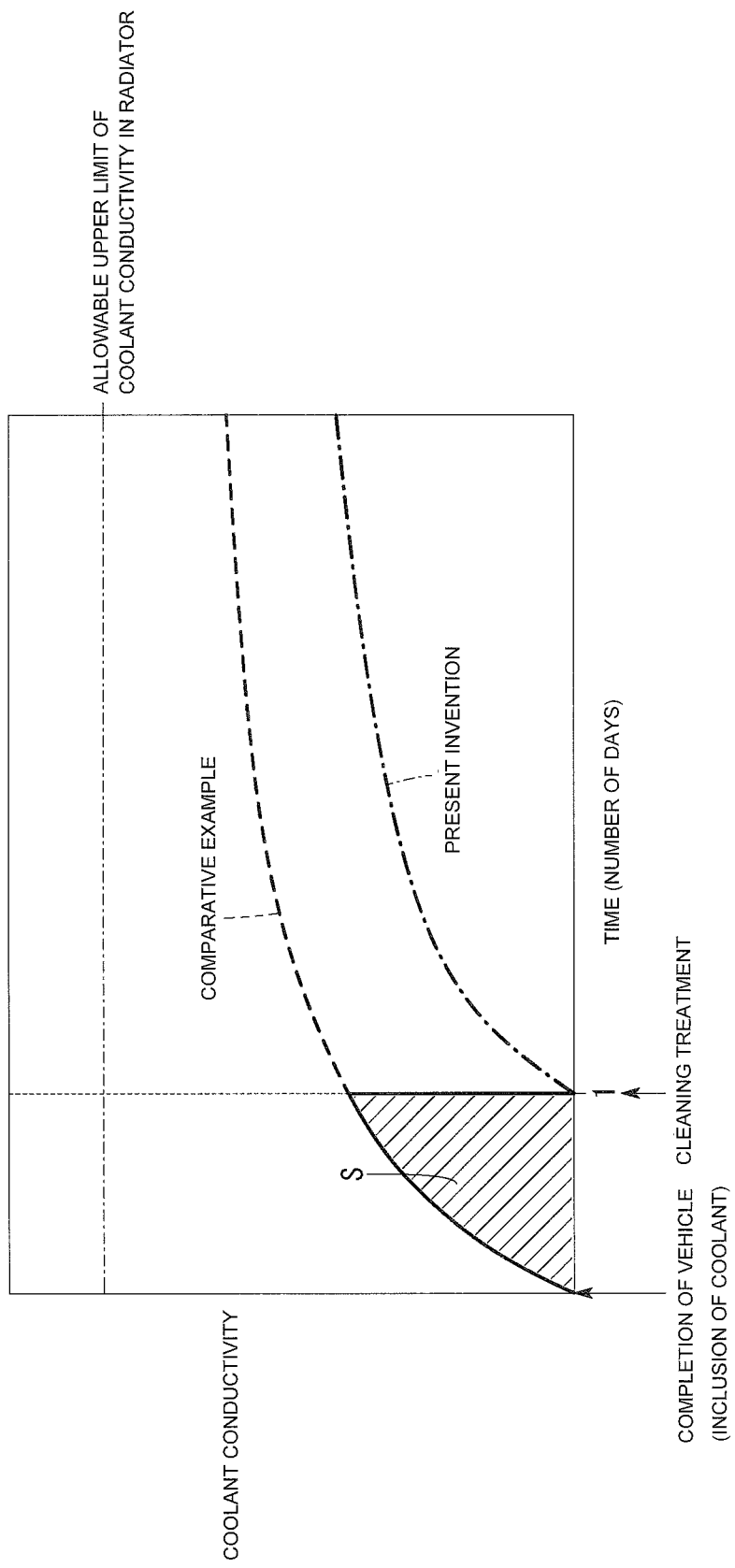
FIG. 6 is an explanatory chart illustrating comparison between the embodiment and a comparative example as to the coolant conductivity observed when the vehicle is left for a long period.

Hence, according to the first embodiment, after the cleaning treatment operation is done, as illustrated in FIG. 6, the coolant conductivity does not exceed a desired conductivity tolerance even when it is increased because the vehicle 12 is left for a long period (see "the present embodiment" in FIG. 6 illustrated by dashed-dotted line). This brings about an effect of enabling the cooling system of the fuel cell system 10 to reliably achieve desired allotted ground fault resistance. Specifically, by actively dissolving ions being the agent causing the increase of coolant conductivity into coolant and removing the ions in the ion exchanger 58 in advance before the vehicle is left for a long period, the increase of coolant conductivity can be effectively suppressed even when the vehicle is then left for a long period.

Note that, in FIG. 6, "the present embodiment" (dashed-dotted line) illustrates a case where the cleaning treatment operation according to the first embodiment is performed one day after the completion of the vehicle (the inclusion of coolant). Further, a hatched area S illustrates a cleaning effect brought about by the first embodiment, by comparison with a case where no cleaning treatment operation according to the first embodiment is performed (comparative example illustrated by dotted line).

In addition, the first embodiment is expected to relax the cleaning control value and simplify inspection at the time of manufacturing of the radiator 52. The first embodiment is also expected to improve the cleaning treatment performance and reduce cost by shortening of the cleaning time period at the time of manufacturing of the radiator 52.

Note that, as described previously, the three-way valve 62 may be constructed so as to operate in switching modes of: letting the port 21 and the port P2 communicate with each other and shutting off the communication between the port P2 and the port P3 (the mode of circulating coolant through the radiator 52 without circulating the coolant through the bypass pipe 56); and shutting off the communication between the port P1 and the port P2 and letting the port P2 and the port P3 communicate with each other (the mode of circulating coolant through the bypass pipe 56 without circulating the coolant through the radiator 52). In this case, in Step S4 above, the three-way valve 62 switches from the mode of circulating coolant through the bypass pipe 56 without circulating the coolant through the radiator 52 to the mode of circulating coolant through the radiator 52 without circulating the coolant through the bypass pipe 56. In other words, it is also possible to circulate coolant through the radiator 52 with the bypass pipe 56 closed. This increases the quantity of coolant flowing through the radiator 52 as compared with the case of circulating coolant through both the radiator 52 and the bypass pipe 56, thus making it possible to further promote dissolution of ions into coolant in the radiator 52. In addition, by actively discharging coolant in the radiator 52 containing a large amount of dissolved ion components, the time period for cleaning treatment operation can be shortened. The same applies to the second embodiment to be described later.

Figure 7:
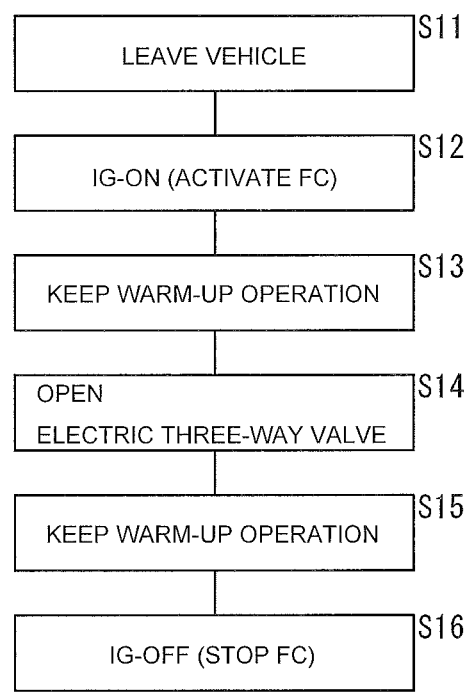
FIG. 7 is a flowchart of a radiator cleaning treatment method according to a second embodiment of the present invention.

Next, a radiator cleaning treatment method according to a second embodiment of the present invention is described with the flowchart illustrated in FIG. 7. Note that the time chart illustrating the radiator cleaning treatment method according to the second embodiment is the same as the time chart (FIG. 4) illustrating the radiator cleaning treatment method according to the first embodiment. The radiator cleaning treatment method according to the second embodiment is a cleaning treatment method in the case where the electric three-way valve 62b that electrically opens automatically when the temperature of coolant reaches the predetermined temperature or higher is used as the three-way valve 62 described above in the fuel cell system 10.

Steps S11 to S13 in the second embodiment are carried out in the same manner as Steps S1 to S3 in the first embodiment.

Then, when the temperature of coolant is increased to the specified temperature by the power generation and warm-up operation of the fuel cell stack 14, the electric three-way valve 62b opens automatically (Step S14). Thereby, the coolant passes through the radiator 52, and circulates through the fuel cell stack 14 and the ion exchanger 58. Then, as in Step S5 and Step S6 of the first embodiment, after the three-way valve 62 opens, the power generation and warm-up operation of the fuel cell stack 14 are still kept for a predetermined time period (around several minutes to several tens of minutes) (Step S15), and then the fuel cell system 10 is stopped by turning off the ignition switch (Step S16).

In this way, according to the second embodiment, ions (ion residues) in the radiator 52 are discharged by circulating coolant through the radiator 52 while generating power in the fuel cell stack 14. Then, the ions discharged from the radiator 52 are removed in the ion exchanger 58 by circulating the coolant containing the ions through the ion exchanger 58. Thereby, the second embodiment can achieve the same effect as the first embodiment described above.

Figure 8:
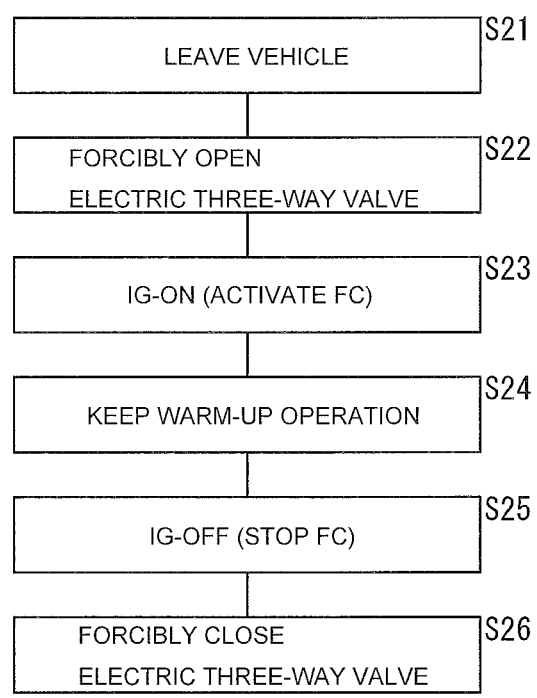
FIG. 8 is a flowchart of a radiator cleaning treatment method according to a third embodiment of the present invention.

Next, a radiator cleaning treatment method according to a third embodiment of the present invention is described with the flowchart illustrated in FIG. 8 and the time chart illustrated in FIG. 9. The radiator cleaning treatment method according to the third embodiment is a cleaning treatment method in the case where the electric three-way valve 62c that can be opened forcibly by energizing the valve by the external power source (e.g. 12V) and giving a valve open command to the valve is used as the three-way valve 62 described above in the fuel cell system 10.

In Step S21 according to the third embodiment, the vehicle 12 is left for the predetermined period as in Step S1 according to the first embodiment.

Next, the electric three-way valve 62c is opened forcibly (Step S22 in FIG. 8). Specifically, the electric three-way valve 62c is opened forcibly by supplying power from the external power source (e.g. 12V) to the electric three-way valve 62c through the service outlet of the valve and giving a valve open command to the valve. The opening of the electric three-way valve 62c makes the port P1 and the port P2 communicate with each other.

Next, once the ignition switch of the vehicle 12 is turned on, the fuel cell system 10 is started, and power generation from the fuel cell stack 14 is started (Step S23 in FIG. 8). Subsequently, the warm-up operation of the fuel cell stack 14 (the heating of the coolant by the heating device) is started and this warm-up operation is kept for the predetermined time period (e.g., around several minutes to several tens of minutes) (Step S24 in FIG. 8). In this case, specifically, coolant is heated by the heater mode of the air conditioner device 66a as the heating device to raise the temperature of the coolant. Preferably, the air conditioner device 66a is operated under the rated power (maximum power) of the heater mode. Further, the windows of the vehicle 12 are preferably fully open.

While the power generation and warm-up operation of the fuel cell stack 14 are performed (during Step S24), the coolant passes through the radiator 52, and circulates through the fuel cell stack 14 and the ion exchanger 58. Thereby, dissolution of ions into the coolant in the radiator 52 is promoted, and the ions in the coolant discharged from the radiator 52 are removed when the coolant containing the ions passes through the ion exchanger 58. Specifically, the coolant circulates and flows through the coolant supply apparatus 50 (cooling system), and residual ions (ion residues) in the radiator 52 are reduced by the repetition of dissolution of ions and removal of the ions, whereby the coolant conductivity is reduced.

As illustrated in FIG. 9, immediately after power generation from the fuel cell stack 14 is started, the ground fault resistance of the cooling system once decreases because of the discharge of ions from metallic members such as the radiator 52, metallic separators, and pipes; however, as the coolant circulates through the cooling system, the ground fault resistance increases gradually because the ions in the coolant are removed by the ion exchanger 58.

After the warm-up operation in Step S24 is kept for the predetermined time period, the fuel cell system 10 is stopped by turning off the ignition switch (Step S25 in FIG. 8). If the number of days for which the vehicle is left in Step S21 is short as in the third embodiment, as illustrated in FIG. 9, the ground fault resistance of the cooling system of the fuel cell system 10 does not fall below an allotted ground fault resistance lower limit throughout all the processes of the cleaning treatment. The time period for which the warm-up operation in Step S24 is kept is preferably set by previously checking time for the cooling system to recover to the allotted ground fault resistance at the time of steady power generation.

Next, the electric three-way valve 62c is closed forcibly (Step S26 in FIG. 8). Specifically, the electric three-way valve 62c is switched back to the normally off state (the mode where only the port P2 and the port P3 communicate with each other) by stopping supplying power from the external power source to the electric three-way valve 62c through the service outlet of the valve.

In this way, according to the third embodiment, ions (ion residues) in the radiator 52 are discharged by circulating coolant through the radiator 52 while generating power in the fuel cell stack 14. Then, the ions discharged from the radiator 52 are removed in the ion exchanger 58 by circulating the coolant containing the ions through the ion exchanger 58. Thereby, the third embodiment can achieve the same effect as the first embodiment described above.

In addition, according to the third embodiment, the electric three-way valve 62c is forcibly opened before initiation of (before power generation in) the fuel cell system 10, and then the fuel cell system 10 is initiated and the treatment of reducing ions in the radiator 52 is performed by the warm-up operation. This makes it possible to further shorten the time period for cleaning treatment operation and reduce the amount of fuel gas used as compared with the first and second embodiments.

As described previously, the three-way valve 62 may be constructed so as to operate in switching modes of: letting the port P1 and the port P2 communicate with each other and shutting off the communication between the port P2 and the port P3 (the mode of circulating coolant through the radiator 52 without circulating the coolant through the bypass pipe 56); and shutting off the communication between the port P1 and the port P2 and letting the port P2 and the port P3 communicate with each other (the mode of circulating coolant through the bypass pipe 56 without circulating the coolant through the radiator 52). In this case, in Step S22 above, the electric three-way valve 62c is switched from the mode of circulating coolant through the bypass pipe 56 without circulating the coolant through the radiator 52 to the mode of circulating coolant through the radiator 52 without circulating the coolant through the bypass pipe 56. In other words, coolant is made to circulate through the radiator 52 with the bypass pipe 56 closed. This increases the quantity of coolant flowing through the radiator 52 as compared with the case of circulating coolant through both the radiator 52 and the bypass pipe 56, thus making it possible to further promote dissolution of ions into coolant in the radiator 52.

The present embodiment provides a radiator cleaning treatment method for an onboard fuel cell system including: a fuel cell that is provided with a coolant passage for allowing coolant to pass therethrough; a radiator that is configured to cool the coolant; a supply line that allows the coolant to circulate from an outlet side of the radiator toward a coolant inlet of the fuel cell; an exhaust line that allows the coolant to circulate from a coolant outlet side of the fuel cell toward an inlet of the radiator; a radiator bypassing line that allows the coolant to circulate from the exhaust line to the supply line while bypassing the radiator; and an ion exchanger that is configured to remove ions contained in the coolant, the method including performing, while a vehicle is stopped, a cleaning treatment of: raising the temperature of the coolant by generating power in the fuel cell; circulating the coolant through the radiator; and causing the ion exchanger to remove ions discharged from the radiator.

In the above radiator cleaning treatment method, it is preferable that the cleaning treatment is performed after an elapse of a predetermined time period from when the onboard fuel cell system is mounted in the vehicle and filling the coolant in the onboard fuel cell system is completed and before the vehicle is delivered to a user.

In the above radiator cleaning treatment method, it is preferable that the cleaning treatment is performed with the radiator bypassing line closed.

In the above radiator cleaning treatment method, it is preferable that the method causes the coolant to circulate through the radiator and the ion exchanger while performing a warm-up operation of heating the coolant by a heating device different from the fuel cell as well as by the power generation in the fuel cell.

In the above radiator cleaning treatment method, it is preferable that the onboard fuel cell system includes a switching valve that is designed to operate so as to circulate the coolant through the radiator when the temperature of the coolant is raised to a predetermined temperature or higher, the system is constructed so as to heat the coolant using a heater mode of an air conditioner device, mounted in the vehicle, as the heating device during the warm-up operation of the fuel cell, and the air conditioner device is operated in the heater mode and under rated power during the warm-up operation of the fuel cell.

In the above radiator cleaning treatment method, it is preferable that the onboard fuel cell system includes a switching valve that is designed to be capable of operating so as to circulate the coolant through the radiator based on an operation command by receiving power from an external power source, the system is constructed so as to heat the coolant using a heater mode of an air conditioner device, mounted in the vehicle, as the heating device during the warm-up operation of the fuel cell, the power generation and warm-up operation of the fuel cell are performed after the switching valve is operated so as to circulate the coolant through the radiator, and the air conditioner device is operated in the heater mode and under rated power during the warm-up operation of the fuel cell.

According to the radiator cleaning treatment method of the present embodiment, at the time of starting the fuel cell, while the vehicle is stopped, ions (ion residues) in the radiator are discharged by circulating coolant through the radiator while generating power in the fuel cell. Then, the ions discharged from the radiator are removed in the ion exchanger by circulating the coolant containing the ions through the ion exchanger. Thereby, the coolant conductivity in the cooling system can be reduced. Accordingly, after the cleaning treatment as described above is done, the coolant conductivity does not exceed a desired conductivity tolerance even when it is increased because the vehicle is left for a long period. This brings about an effect of enabling the cooling system of the fuel cell system to reliably achieve desired allotted ground fault resistance.

Obviously, numerous modifications and variations of the present invention are possible in light of the above teachings. It is therefore to be understood that within the scope of the appended claims, the invention may be practiced otherwise than as specifically described herein.

What is claimed is:

1. A radiator cleaning treatment method for an onboard fuel cell system including:
    a fuel cell that is provided with a coolant passage for allowing coolant to pass therethrough;
    a radiator that is configured to cool said coolant;
    a supply line that allows said coolant to circulate from an outlet side of said radiator toward a coolant inlet of said fuel cell;
    an exhaust line that allows said coolant to circulate from a coolant outlet side of said fuel cell toward an inlet of said radiator;
    a radiator bypassing line that allows said coolant to circulate from said exhaust line to said supply line while bypassing said radiator; and
    an ion exchanger that is configured to remove ions contained in said coolant,
    the method comprising performing, while a vehicle, in which the onboard fuel cell system is mounted, is stopped, a cleaning treatment of:
    raising a temperature of said coolant by generating power in said fuel cell during a warm-up operation;
    circulating said coolant through said radiator mounted in the vehicle; and
    causing said ion exchanger to remove ions discharged from said radiator,
    wherein said cleaning treatment is performed after an elapse of a predetermined time period from a first time at which filling of said coolant in said onboard fuel cell system is completed to a second time before said vehicle is delivered to a user.

2. The radiator cleaning treatment method according to claim 1, wherein said cleaning treatment is performed with said radiator bypassing line closed.

3. The radiator cleaning treatment method according to claim 1, wherein the method causes said coolant to circulate through said radiator and said ion exchanger while the onboard fuel cell system performs the warm-up operation of heating said coolant both by a heating device different from said fuel cell and by the power generation in said fuel cell.

4. The radiator cleaning treatment method according to claim 3, wherein said onboard fuel cell system comprises a switching valve that is designed to operate so as to circulate said coolant through said radiator when a temperature of said coolant is raised to a predetermined temperature or higher,
    said heating device is an air conditioner device, mounted in said vehicle, and
    said air conditioner device is operated in a heater mode and at maximum power during the warm-up operation of said fuel cell.

5. The radiator cleaning treatment method according to claim 3, wherein said onboard fuel cell system comprises a switching valve that is designed to be capable of operating so as to circulate said coolant through said radiator based on an operation command by receiving power from an external power source,
    said heating device is an air conditioner device, mounted in said vehicle,
    the power generation and warm-up operation of said fuel cell are performed after said switching valve is operated so as to circulate said coolant through said radiator, and
    said air conditioner device is operated in a heater mode and at maximum power during the warm-up operation of said fuel cell.

* * * * *